United States Patent [19]
Zanini

[11] 3,814,986
[45] June 4, 1974

[54] MOTOR CONTROL CIRCUIT
[75] Inventor: Peter Zanini, Avon, Conn.
[73] Assignee: Arrow-Hart, Inc., Hartford, Conn.
[22] Filed: July 17, 1972
[21] Appl. No.: 272,122

Related U.S. Application Data
[62] Division of Ser. No. 54,475, July 13, 1970, abandoned.

[52] U.S. Cl.................. 317/13 R, 317/16, 317/31, 317/33 SC
[51] Int. Cl. ............................................ H02h 7/08
[58] Field of Search.......... 317/16, 31, 33 R, 33 SC, 317/13 R

[56] References Cited
UNITED STATES PATENTS
3,317,795  5/1967  Steen .............................. 317/33 SC
3,419,757  12/1968  Steen .............................. 317/33 SC
3,551,746  12/1970  Rubner........................... 317/31 X

*Primary Examiner*—James D. Trammell
*Attorney, Agent, or Firm*—William F. Sonnekalb

[57] ABSTRACT

A circuit for supplying a progressively increasing amount of power to a plural phase motor during rotor acceleration employs a relaxation oscillator to vary the effective conduction angle for each applied line voltage phase. Circuitry is provided to restore an oscillator timing capacitor to a reference condition at a like point during each power phase cycle such that each phase supplies essentially the same monotonically increasing motor accelerating energy.

In accordance with varying aspects of the present invention, overload and undervoltage protective circuits remove power from the motor responsive to abnormal operating conditions.

9 Claims, 14 Drawing Figures

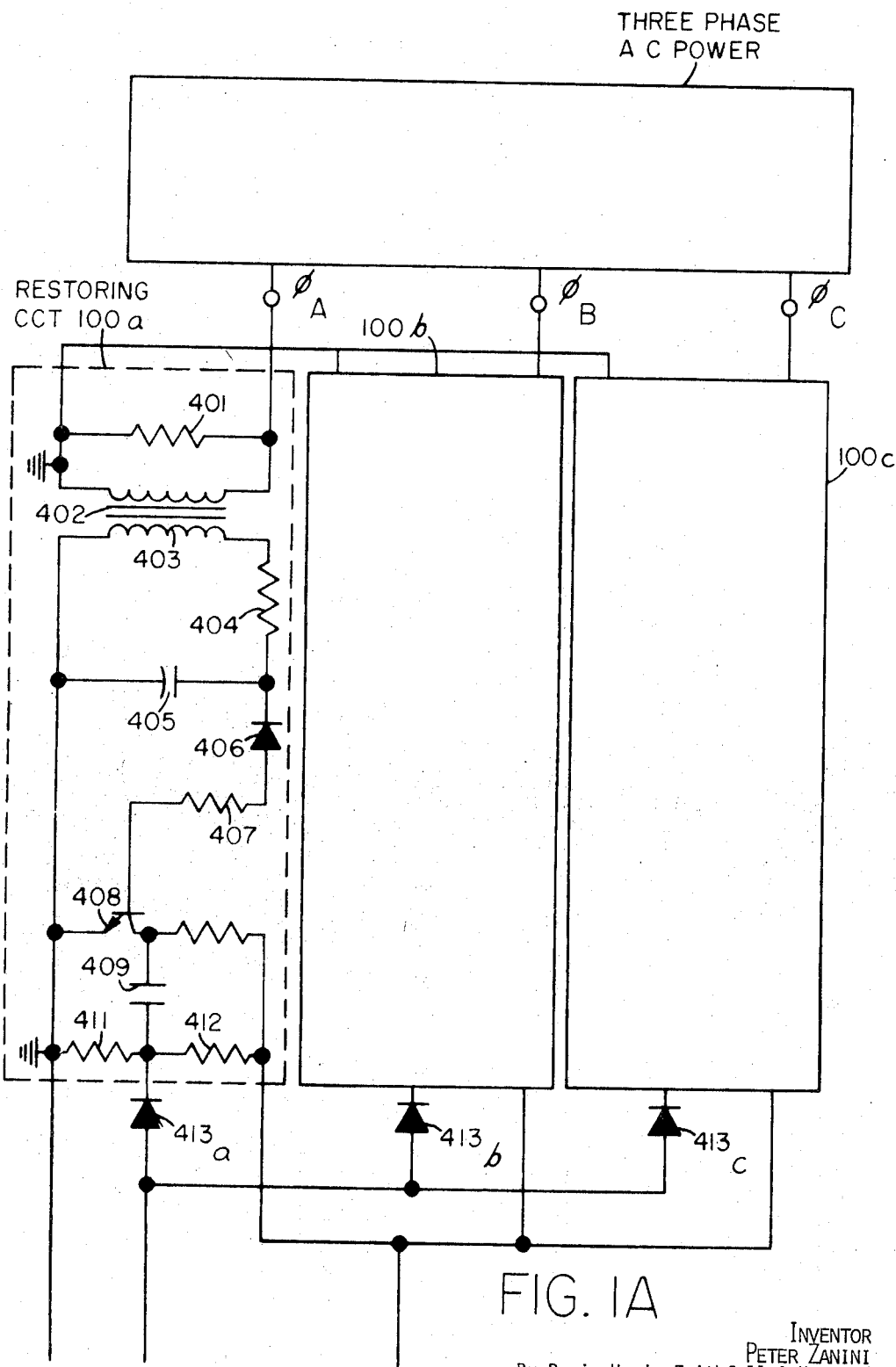
FIG. IA
INVENTOR
PETER ZANINI
By Davis, Hoxie, Faithfull & Hapgood
Attorneys

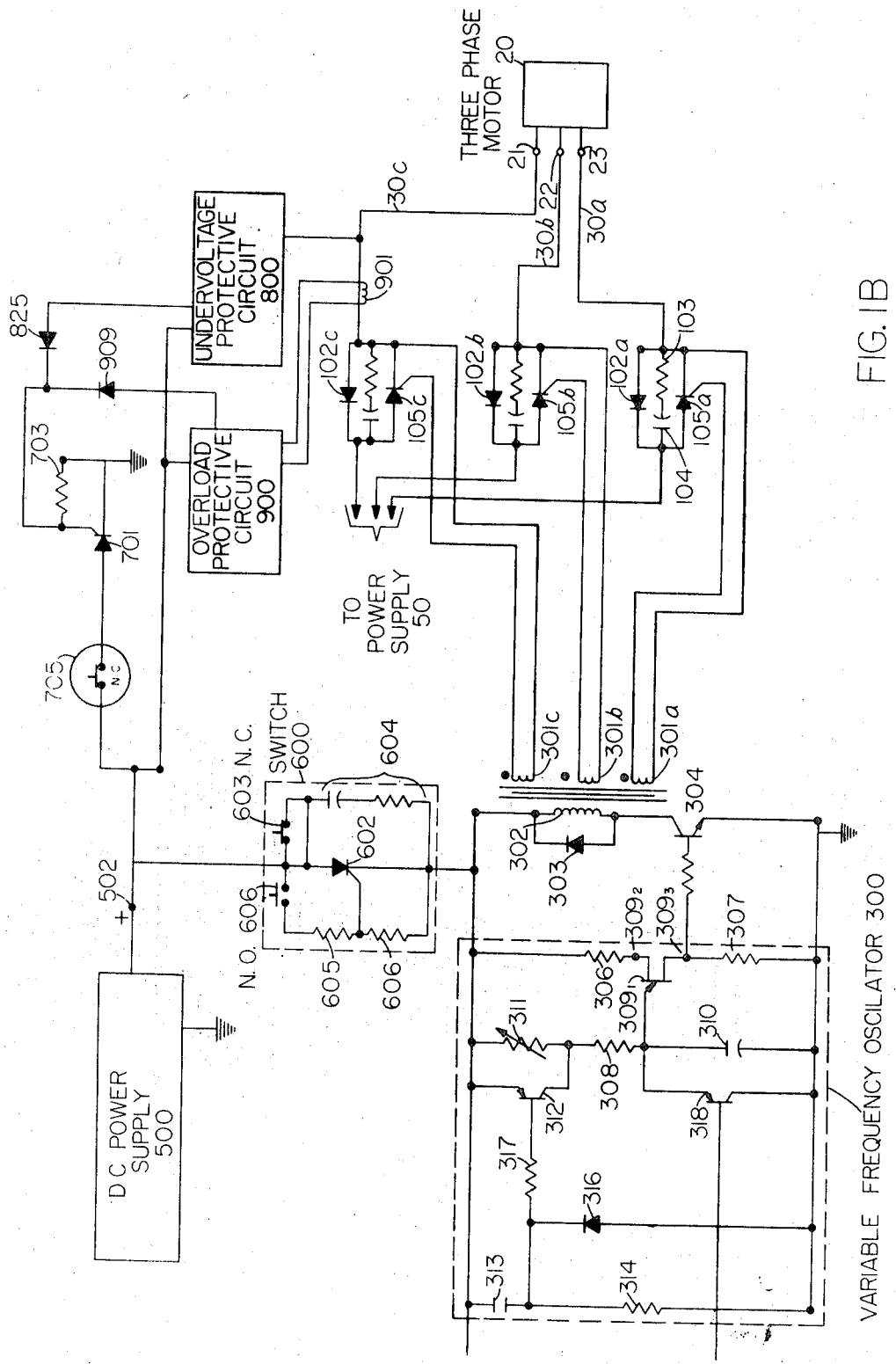
FIG. IB

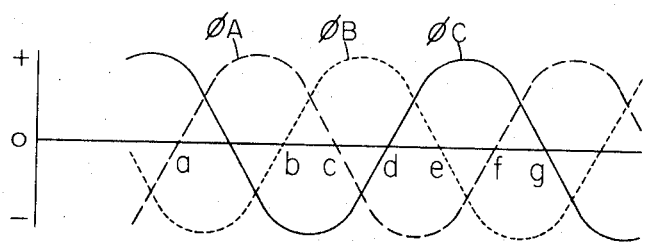
FIG. 2A LINE VOLTAGE
FIG. 2B CCT 100a
FIG. 2C CCT 100b
FIG. 2D CCT 100c
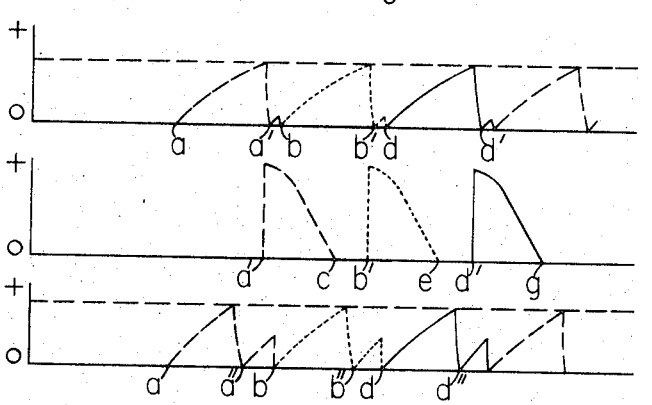
FIG. 2E VOLTAGE ACROSS CAPACITOR 310 LOW POWER
FIG. 2F APPLIED POSITIVE LINE VOLTAGE LOW POWER
FIG. 2G VOLTAGE ACROSS CAPACITOR 310 MEDIUM POWER
FIG. 2H APPLIED POSITIVE LINE VOLTAGE MEDIUM POWER
FIG. 2I VOLTAGE ACROSS CAPACITOR 310 HIGH POWER
FIG. 2J APPLIED POSITIVE LINE VOLTAGE HIGH POWER

000
MOTOR CONTROL CIRCUIT

This application is a division of application Ser. No. 54,475, filed July 13, 1790, now abondoned.

This invention relates to motor control circuits and, more specifically, to an improved circuit arrangement for supplying progressively increasing electrical power to a motor during a starting interval, e.g., as a rotor accelerates from rest to full operative rotational speed.

The current flow through a motor winding or windings depends upon the difference in potential between the applied (e.g., line) voltage, and the opposing ("back") electromotive force induced by generator action in the motor windings responsive to a rotating rotor. However, when the motor is just starting from rest, there is essentially no counter electromotive force, and thus large currents tend to flow from the energy source through the motor windings during motor starting. This excess current flow is especially pronounced when the motor is relatively heavily loaded, and thus exhibits a high moment of inertia load which cannot accelerate rapidly.

Accordingly, it is desirable when starting a motor, especially if relatively heavily loaded, to reduce the power applied to the motor until the rotor approaches design speed. This power reduction has been effected by lowering the effective applied voltage and/or power, or by adding a current limiting impendance (or the equivalent additional accelerating coils) is series with motor windings during the start-up period. The mechanisms which effect temporary power limiting are then operatively removed from service after the desired speed has been obtained, as by switching apparatus.

It is an object of the present invention to provide an improved motor controlling circuit.

More specifically, an object of the present invention is the provision of a solid state motor control circuit which supplies a monotonically increasing amount of power from a single or plural phase voltage source to a motor as the motor accelerates toward operative speed.

It is another object of the present invention to provide circuit arrangements for removing power from a motor when the applied motor driving voltage falls below a minimally acceptable level, or where the motor draws excessive current from the power source.

The above and other objects of the present invention are realized in a specific illustrative motor control circuit for supplying a progressively increasing amount of energy to plural phase alternating current motor. A unijunction transistor relaxation oscillator is employed to selectively trigger motor energizing silicon controlled rectifiers a delayed interval after a predetermined reference point during each cycle of the several power phases, with motor power control being effected by regulating the electrical conduction angle during which the individual rectifiers conduct.

Restoring circuitry is provided to completely discharge a timing capacitor in the relaxation oscillator at the beginning of each cycle of each line phase. The voltage across a second capacitor determines the frequency (and thus also the period) of the relaxation oscillator.

When the motor first begins to accelerate, the second capacitor is initially uncharged, and relatively little power is supplied to the motor (a relatively large oscillator period giving rise to a relatively low power conduction angle). As time elapses and the motor attains full operational speed, the second capacitor charges completely and rated power is thereafter supplied to the motor (a relatively small oscillator period giving rise to a relatively large conduction angle). The transition in power conduction angle is continuous to reflect the necessarily continuous acceleration of the motor.

In accordance with other aspects of the invention, protective circuitry is utilized to operatively disconnect power from the motor when abnormal voltage or load conditions obtain.

The above and other features and advantages of the present invention are realized in a specific, illustrative embodiment thereof, described in detail hereinbelow in conjunction with the accompanying drawing, in which:

FIGS. 1A and 1B respectively comprise the left and right portions of a motor control circuit which embodies the principles of the present invention;

FIGS. 2A–2J are timing diagrams illustrating the voltage waveforms associated with selected circuit components in the arrangement of FIGS. 1A and 1B;

Figure 3:
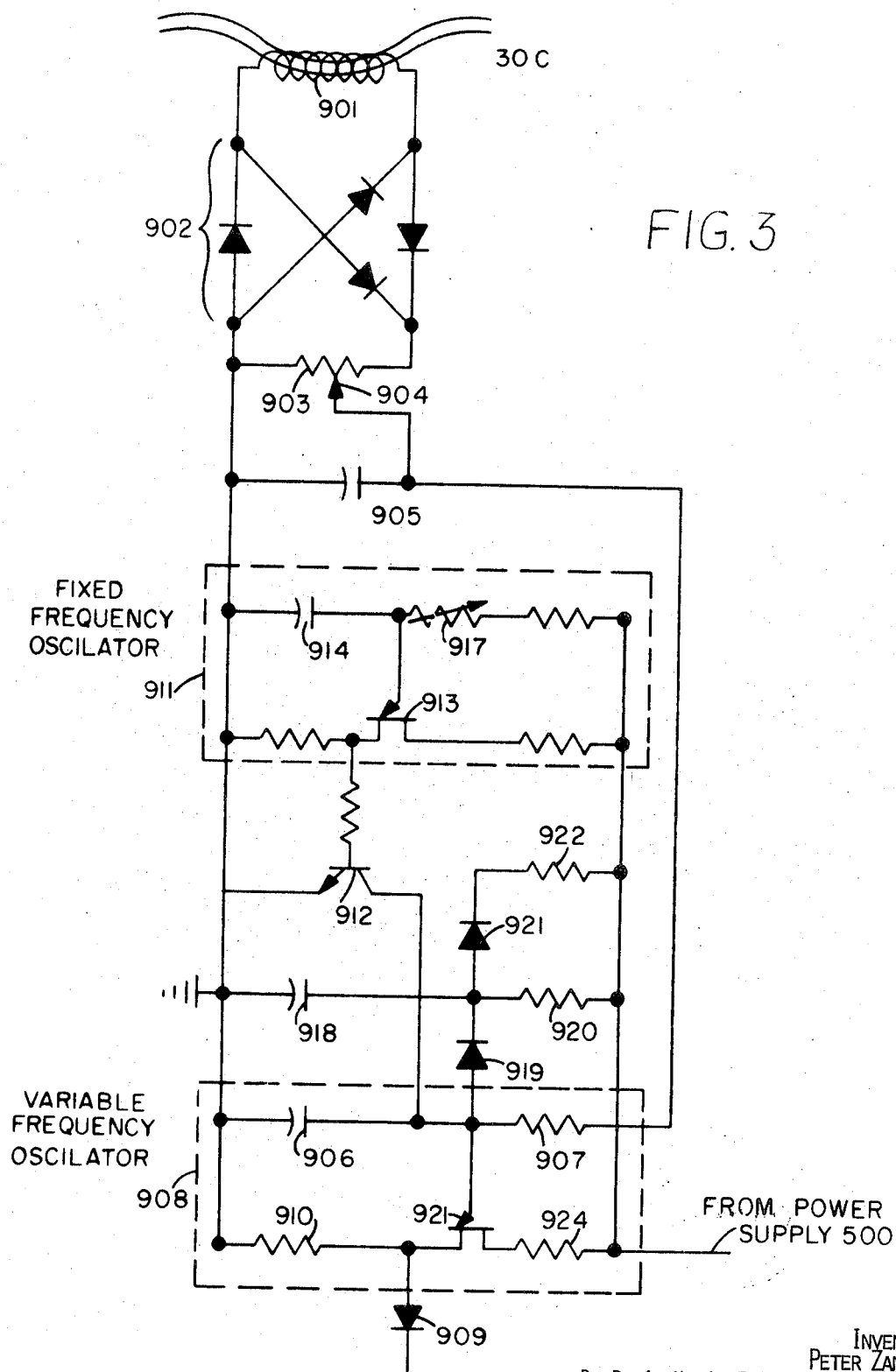
FIG. 3 is a schematic diagram depicting an overload protective circuit 900 shown in block form in FIG. 1B.

Referring now to FIGS. 1A and 1B, hereinafter referred to as composite FIG. 1, there is shown an electronic control arrangement for energizing a three phase motor 20 in a preferred manner from a three phase power source 50, e.g., from a power main. In particular, it is desirable to supply relatively little power from source 50 to each input terminal 21, 22 and 23 of the three phase motor when the motor is just starting rotation, and can thus generate only a minimal current limiting counter electromotive force. Should full voltage be supplied to the motor terminals at the beginning of motor rotation, excessively large currents would flow through the motor windings, this being especially pronounced if the motor is relatively heavily loaded. Moreover, the power supplied to each winding under control of the FIG. 1 circuitry must be the same or the motor becomes unbalanced, and possibly damaged.

In accordance with the principles of the present invention, a variable frequency relaxation oscillator 300 is employed to generate an output control pulse which is delayed in time from the negative to positive transition of each applied line voltage phase, this transition being signaled by an associated one of three restoring circuits 100$_a$–100$_c$ considered hereinbelow. The oscillator output pulse (or the first of several such pulses) renders a transistor 304 conductive, thereby acting through a transformer 305 to energize the gate-cathode junctions of three silicon controlled rectifiers 105$_a$–105$_c$ (hereinafter SCR) which are associated with the three power phases A-C respectively.

The anode-cathode of the SCR 105 associated with the line phase giving rise to the input trigger signal is forward biased when its input junction is energized, and this rectifier thus becomes conductive and couples the remaining portion of the applied positive half-wave line voltage to the corresponding motor 20 terminal 21, 22 or 23. The two other SCRs 105 do not respond to the gate drive, either because their anode-collector junction is reversed biased or because one device is already conducting. The motor windings may be connected to the terminals 21-23 in any known manner, e.g., in a "Y" or delta configuration.

When power is first applied to the motor and the motor rotor first starts rotating, the variable frequency relaxation oscillator 300 cycles at a relatively low frequency. There is thus a relatively long time delay from the beginning of each positive half cycle of each line phase until the time when the corresponding SCR 105 begins to conduct, and only a relatively small amount of energy is coupled to the motor 20 at the end portion of the positive half wave. As the motor turns more rapidly, the delay affected by the relaxation oscillator 300 monotonically decreases (i.e., oscillator frequency increases) such that progressively more energy is supplied to the motor 20. When the motor rotates at design speed, the SCRs 105 conduct for the major part of the positive voltage half cycles of each line phase thereby supplying full power to the motor 20. The motor current return path comprises a plurality of diodes $102_a$–$102_c$ connected in parallel with the rectifiers 105. The conduction angle for the diodes 102 depends upon the particular winding configuration and is not of interest here.

Three circuits $100_a$–$100_c$ are employed to start (initialize) the variable frequency relaxation oscillator 300 at a particular state during each line phase cycle, the oscillator 300 thereby producing an accurately timed conduction angle delay for each line pahse. More specifically, the restoring circuits $100_a$–$100_c$ are respectively employed to set a timing capacitor 310 in the oscillator 300 to zero voltage at the negative to positive transition of each line phase, the circuits 100 acting through an associated one of three diodes $413_a$–$413_c$ which form an OR logic network for discharging a capacitor 310 through PNP transistor 318.

In accordance with other aspects of the present invention, overload (i. e., overcurrent) protective circuitry 900 may be employed to disable the motor control apparatus of FIG. 1, thereby operatively disconnecting the motor 20 from the voltage source 50, when motor current exceeds a maximum bound. Further, an undervoltage protective circuit 800 may be utilized to disable the motor control apparatus when less than a minimally acceptable line voltage is present.

Examining now the arrangement of FIG. 1 in detail, the variable frequency relaxation oscillator 300 employs a unijunction transistor 309 having resistors 306 and 307 connected to the transistor base 2 and base 1 terminals $309_2$ and $309_3$, respectively. The oscillator timing capacitor 310 is connected between the emitter $309_1$ of the unijunction transistor and ground.

In its cyclic operation, charging current is supplied to the timing capacitor 310 via a resistor 308 thereby progressively increasing the voltage across the capacitor. When this voltage attains the triggering threshold for the unijunction transistor 309 (a voltage corresponding to approximately 0.5–0.8 of the difference in potential at the base 1 and base 2 terminals), the unijunction transistor fires. A low impedance path is thereupon developed between the emitter and base 1 terminals $309_1$–$309_3$ of the unijunction transistor 309 thereby rapidly discharging the capacitor 310 through the resistor 307.

A positive pulse is thus developed across the resistor 307 which renders a transistor 304 conductive, thereby energizing the primary winding 302 of a transformer 305. The energized transformer primary winding gives rise to positive pulses in each of three transformer secondary windings $301_a$–$301_c$ associated with the line phases A-C, respectively. The pulses are coupled from these secondary windings to the gate-cathode input junctions of the SCRs 105. As more fully discussed below, these SCR gating signals turn on at most only one of the silicon controlled rectifiers 105, the other devices 105 either being prevented from conducting by a negative anode-cathode potential, or one of the rectifiers already residing in a conducting state for a high power (large conduction angle) condition. A diode 303 is connected across the transformer primary winding 302 to dissipate the energy stored in the inductive winding 302 when the transistor turns off.

The characteristic oscillatory period effected by the unijunction transistor circuitry 300 is determined by the rate at which the timing capacitor 310 is charged. This, in turn, is determined by the amount of current supplied to and through the resistor 308. As the frequency of the oscillator 300 becomes more rapid (and the period smaller), the first conductive pulse will be supplied to the transistor 304 progressively earlier in a line phase positive half cycle and thus more power (larger conduction angle) will be supplied to the motor via a selected one of the SCRs 105. Conversely, the longer the period for the oscillator 300, the longer the time delay between the beginning of the positive line phase and SCR conduction, with correspondingly less energy being supplied to the motor 20.

Capacitor charging current is supplied to the resistor 308 via two paths, viz., by way of a resistor 311 and a transistor 312. The adjustable resistor 311 is employed to define a minimum electrical conduction angle (60°), i.e., to supply a minimum charging current to the capacitor 310 in the absence of any contribution from the transistor 312. The resistance of the element 311 is relatively large, such that the maximum current supplied by the path 311–308 to the capacitor 310 is relatively small, the oscillator thus exhibiting a long characteristic period.

When power is first supplied to the motor by actuating a switch assembly 600 considered hereinbelow, D.C. potential from the source 500 is impressed across a series circuit comprising a resistor 314 and an initially uncharged capacitor 313. Since the uncharged capacitor 313 has no initial potential, the base-emitter junction of the PNP transistor 312 is not energized through a current limiting resistor 317, and the transistor 312 is nonconductive. As time progresses, the capacitor 313 charges at a slow rate (corresponding to motor acceleration) through the resistor 314 hence forward biasing the transistor 312 which begins to supply current via its collector terminal to the resistor 308. Accordingly, the frequency of the oscillator 300 is increased by reason of this added charging current to the capacitor 310.

The magnitude of the additional capacitor 310 charging current from the transistor 312 is dependent upon the voltage across the capacitor 313. Accordingly, when the motor is first turned on, the transistor 312 supplies little or no charging current and the oscillator 300 is characterized by a relatively long oscillatory period. As time progresses, an increasing voltage is developed across the capacitor 313, giving rise to an increasing current flow at the collector of the transistor 312 and a continuously decreasing period for the oscillator 300. Hence, during this motor starting interval, a progressively increasing amount of power is supplied to the motor 20 from the three phase source 50.

Finally, after a time corresponding to that when the motor has attained rated speed, the capacitor 313 is fully charged; maximum current is present at the collector of the transistor 312; and the oscillator 300 operates at its maximum frequency —lowest period — such that the SCRs 105 conduct for almost the full positive half cycle for each line phase. Full operational power is thus supplied to the motor 20.

As noted above, the power supplied to the motor during each positive half cycle of each line phase is dependent upon the delay between the negative to positive voltage transition for a line phase and the first firing of the unijunction transistor 309 after that transition. It is thus important to control this delay period, as by restoring the timing capacitor 310 to zero voltage during this transition during each cycle of each phase to start the timing oscillator 300 from a fixed reference condition. To this end, the PNP transistor 318 is connected across the capacitor 310 to periodically discharge the capacitor. The restoring circuits $100_a$ through $100_c$ are respectively employed to supply negative going voltage pulses to the base of the transistor 318 via an associated diode $413_a$, $413_b$, or $413_c$ at the negative to positive voltage transition for the power phases A, B, and C respectively.

Examining the restoring circuit $100_a$ associated with the power phase A, which is illustrative of the other circuits $100_b$ and $100_c$, the phase A line voltage is coupled by a transformer 402 and a diode 406 to the base of a transistor 408. The diode 406 affects half wave rectification, such that the transistor 408 is rendered conductive at the beginning of each positive line voltage half cycle for the duration of each such half cycle. The resistor 407 is employed for current limiting, and elements 401, 404 and 405 are utilized for transient suppression.

When the transistor 408 is rendered conductive at the voltage polarity transition of line phase A, its collector falls from a potential corresponding to the output 502 of the D.C. power supply 500 to near ground, i.e., to the saturation voltage of the device 408. This negative going voltage change is coupled by a capacitor 409 to the junction of two resistors 412 and 411, and thereby also to the base of the PNP transistor 318 via the diode $413_a$. The negative transient renders the transistor 318 conductive at the beginning of the positive half cycle for the line phase A, thereby fully discharging the capacitor 310 at this time. To insure saturation of the transistor 318, the resistors 411 and 412 are preferably selected so that when the transistor 408 is initially saturated the junction point of resistors 411 and 412 is brought to a potential less than that of ground. The impedance of the resistor 412 is made sufficiently small such that the capacitor 409 rapidly charges through the saturated transistor 408 to reverse bias the diode $413_a$, thereby quickly rendering the transistor 318 nonconductive. This permits the capacitor 310 to charge and begin a first oscillatory timing cycle in the manner discussed above.

The switch assembly 600 for energizing the motor 20 comprises a first normally open switch 606 which is momentarily depressed to activate the motor. The closed contacts 606 couple the positive output of the source 500 to the gate of a silicon controlled rectifier 602 acting through voltage divider resistors 605 and 606, thereby firing the rectifier 602. Once fired, the SCR 602 effectively couples the power output of the D.C. power supply 500 to the timing apparatus considered above. A series resistor-capacitor network 604 is connected across the SCR anode-cathode junction to prevent the device 602 from conducting responsive to a spurious voltage transient, and a normally closed switch 603 is utilized in series between the SCR 602 and the power supply 500 to selectively render the device 602 nonconductive by interrupting its anode current path, thereby removing power from the FIG. 1 control circuitry and stopping the motor 20.

The operation of the FIG. 1 motor control arrangement discussed above may be illustrated in conjunction with the timing diagrams of FIGS. 2A–2J. Referring now to FIG. 2A, there is shown three sinusoidal voltage waveforms of equal amplitude, and disposed 120 electrical degrees apart, corresponding to the three A.C. power phases. Drawings associated with the power phase A are shown as a dashed line throughout FIG. 2; those associated with the power phase B are shown as a dotted line; and those associated with the power phase C are shown as a solid line. Assume now that the motor 20 is just being started. At the time $a$ shown in FIGS. 2A and 2B, the line voltage phase A undergoes a negative to positive voltage transition. Accordingly, the restoring circuit $100_a$ momentarily goes negative and energizes the transistor 318 at the time $a$ (FIG. 2B), thus fully discharging the capacitor 310. This is shown for the time $a$ in FIG. 2E which depicts the voltage across the capacitor 310, this being the voltage which will selectively trigger the relaxation oscillator 300 and unijunction transistor 309 when it attains the switching level shown dashed in FIG 2E. The waveforms of FIGS. 2E and 2F correspond to low power, initial start-up operation for the motor 20, and may be viewed in conjunction with the waveforms of FIGS. 2A–2D which are common to all power conditions.

Following momentary conduction of the transistor 318, the capacitor 310 starts charging, as shown following the time $a$ in FIG. 2E. Since the capacitor 313 has essentially no charge therein at this time, no current is supplied to the capacitor 310 by the transistor 312. Accordingly, the voltage across the capacitor 310 rises exponentially at a relatively slow rate determined by the current supplied thereto by the resistors 308 and 311.

At the time $a'$ shown in FIG. 2E, the critical level is attained; the unijunction transistor 309 triggers; and the transistor 304 is rendered conductive. Accordingly, a voltage transient is induced in the three transformer secondary windings $301_a$–$301_c$ and coupled therefrom to forward bias the gate-cathode junctions of the three SCRs $105_a$–$105_c$. Since the negative anode-cathode voltages are impressed across the anode-cathode terminals of the SCRs $105_b$ and $105_c$ associated with the line phases B and C at the time $a'$ (see FIGS. 2A and 2E), these two rectifiers do not conduct. Correspondingly, since the anode-cathode of the rectifier $105_a$ is forward biased at the time $a'$, this rectifier is rendered conductive, and remains conductive for the remainder of the positive half cycle, as shown in FIG. 2F for the interval $a'$–$c$, until the device is turned off by the negative going anode-cathode potential about the time $c$. Thus, the portion of the positive line phase A between the times $a'$ and $c$ given by the dashed curve in FIG. 2F, is supplied to the motor 20.

When the motor 20 is just starting, this truncated voltage is applied for much less than the positive full half cycle. However, to prevent spurious triggering of the phase B SCR $105_b$, the maximum delay $a-a'$ must be something less than 120 electrical degrees, corresponding to a minimum conduction angle of 60 electrical degrees. For any greater delay, the triggering point $a'$ would occur later than the time $b$ of FIG. 2A, when the line phase B goes positive, and thus all conditions for conduction of the SCR $105_b$ as well as for the SCR $105_a$ would be met.

After the capacitor 310 discharges at the time $a'$ (FIG. 2E), it initiates another oscillatory cycle. Part way through this cycle, the line phase B goes positive at the time $b$, thus causing the restoring circuit $100_b$ to generate a negative pulse (FIG. 2C) which triggers the transistor 318, thereby fully discharging the capacitor 310, as shown at the time $b$ in FIG. 2E. Absent this restoring function, the phase B SCR $105_b$ would randomly (here prematurely) be gated on.

Following the restoring pulse of FIG. 2C, the relaxation oscillator 300 begins a new cycle of oscillation as shown following the time $b$ in FIG. 2E, again triggering the unijunction transistor 309 at a time $b'$ when the critical voltage has been attained. As before, a voltage pulse is induced in the three secondary windings 301 at the time $b'$ when the unijunction transistor 309 fires. At the time $b'$, only the silicon controlled rectifier $105_b$ has a forward biased anode-cathode junction and thus only this rectifier conducts. Accordingly, for the interval $b'-e$ of FIG. 2F, the truncated portion of the phase B positive half cycle (something more than 60 electrical degrees) is supplied to the motor terminal 22. Because the capacitor 313 has attained some voltage in the interval since the phase A voltage $a'-c$, the period $b-b'$ is somewhat less than the period $a-a'$. However, the time constant of the elements 313–314 is made very long compared with the period of a 60 c.p.s. or other power signal, there is no marked change between these two intervals.

Similarly, the line phase C recitifer $105_c$ is rendered conductive for the interval $d'-g$ (see FIGS. 2A, 2D, 2E and 2F). Further, the cyclic waveforms shown in FIGS. 2E and 2F repetitively continue, with the signals associated with the line phases A, B and C alternating in that order.

The electrical waveforms characterizing an intermediate state for the motor 20, i.e., a state in midrange between zero speed and rated speed, may be seen by examining FIGS. 2A–2D in conjunction with the waveforms of FIGS. 2G and 2H. Since the capacitor 313 is charged to an intermediate voltage state under the assumed conditions, the relaxation oscillator 300 cycles at a higher frequency than that considered above, thus producing a smaller initial time delay. Accordingly, the delay interval $a-a''$ shown in FIG. 2G is less than the $a-a'$ delay of FIG. 2E. The line phase A is thus operatively supplied to the motor for the interval $a''-c$ shown in FIG. 2H. This corresponds to a longer portion of the 180° positive half cycle $a-c$, with correspondingly more energy, than the truncated half cycle $a'-c$ of FIG. 2F for the "just started" condition. Again, the second oscillatory period $a''-b$ for the oscillator 300 is terminated by the incidence of the transistor 318 being rendered conductive by the voltage transition of the line phase B. Similar voltage pulses, supplied to the motor 20 during the line phases B and C, are shown by the dotted and solid lines in FIG. 2H, each such pulse being longer and of a higher energy content than the corresponding pulses of FIG. 2F.

Finally, the waveforms associated with the FIG. 1 apparatus for a motor rotating near and at rated speed may be seen from FIGS. 2A–2D in conjunction with FIGS. 2I–2J. For this condition, the capacitor 313 is fully charged, such that the relaxation oscillator 300 will undergo a plurality of complete cycles for each line phase half cycle. Each line phase will conduct for most of the 180° positive half cycle, there being an overlap between the beginning of conduction in one line phase, and termination of conduction of the previous line phase.

The arrangement of FIG. 1 has thus been shown to start the motor 20 in a preferred manner, i.e., to supply a relatively small, balanced amount of energy to the motor 20 when it is first starting, and to supply fully rated energy to the motor when it attains full speed.

In accordance with one aspect of the present invention it is desired to stop the motor 20 when excessive current is supplied to any of the motor windings via the motor terminals 21, 22 or 23. To this end, the overload protection circuitry shown generally in FIG. 1, and in detail in FIG. 3, may be employed. A normally nonconductive silicon controlled rectifier 701 (FIG. 1) is connected between the output 502 of the D.C. power supply 500 and ground through a normally closed switch 705. When an overload condition is sensed (or an undervoltage condition as described hereinafter), the rectifier 701 is rendered conductive thereby effectively connecting a short circuit (low voltage clamp) across the power supply 500. The output of the power supply will thus comprise only a very low voltage determined by the conduction properties of the fired rectifier 701 and the internal impedance of the source 500. This near ground, nominal voltage is not enough to drive the circuitry of the FIG. 1 arrangement, and thus the transistor 304 never conducts. Accordingly, the SCRs 105 are not energized, and the line phases A, B and C are isolated from the motor by the elements 105. Alternatively, the supply 502 may include a fuse which becomes open circuited when current flows in the SCR 701.

The overload (overcurrent) protective circuitry 900 (FIG. 3) comprises a sensing winding 901 coupled to one of the conductors $30c$ which supplies energy to the motor 20. An overload condition is manifested by a current in one of the lines 30 exceeding its maximum limit. This condition occurs, for example, when a motor is too heavily loaded or suffers a mechanical or electrical fault. Since the currents through the conductors $30_a$–$30_c$ are typically approximately equal, the protective circuit 700 may be connected to any such winding, e.g., to the winding $30_c$ associated with power phase C.

The alternating current in the conductor $30_c$ induces a voltage in the winding 901 disposed therearound. The induced voltage is rectified as by a full wave bridge 902 and converted to a direct potential by a low pass filter comprising a potentiometer 903 and a shunt capacitor 905. The D.C. voltage developed across the capacitor 905, as adjusted by setting a potentiometer tap 904, is connected to a variable frequency oscillator 908 of the form considered above, i.e., of the relaxation unijunction type. Also, a constant frequency reset oscillator 911 as of the unijunction type is driven by the fixed output voltage from the D.C. power supply 500.

The passive timing element in the oscillator 911, and the tap 904 controlling the frequency of the oscillator 908, are adjusted such that the oscillator 911 is normally of a higher frequency than the oscillator 908. Accordingly, before a timing capacitor 906 can attain sufficient voltage to trigger an associated unijunction transistor 921, the oscillator 911 will have undergone at least one complete cycle of operation thereby supplying a positive output voltage at the base 1 terminal of a unijunction transistor 913 thereof. This positive pulse energizes a transistor 912, which discharges the capacitor 906 before it can trigger the transistor 921.

However, when the current in the motor conductor $30_c$ exceeds a predetermined maximum bound, the increased alternating voltage induced in the sensing winding 901 increases the voltage across the capacitor 905, thereby also increasing the frequency of the variable frequency oscillator above that of the oscillator 911 constant frequency. Accordingly, within two cycles of the oscillator 911, the capacitor 906 fully charges and triggers the unijunction transistor 921 without being discharged by the transistor 912. When the transistor 921 fires, a positive voltage pulse is developed across a base 1 resistor 910 and connected by a diode 909 to the gate of the controlled rectifier 701.

The rectifier 701 therefore fires and disables the output of the power supply 500 to de-energize the motor 20 as disclosed above. The motor will not operate until the problem causing the overload condition is repaired, and the normally closed switch 705 opened to terminate conduction in the clamping rectifier 701 to restore the output of the power supply 500. A resistor 703 is employed to desensitize the input junction of the rectifier 701 to prevent the rectifier from conducting responsive to spurious transient signals.

To desensitize the composite overload protective circuitry 900 of FIG. 3 during initial motor start-up, a capacitor 918 may be effectively connected in parallel with the timing capacitor 906 by a diode 919. During the initial charging cycles, the effective oscillatory period of the variable frequency oscillator 908 is made longer by reason of the added capacitance of the element 918, and the oscillator 908 will thus not trigger when a higher than normal current is then present in the conductor $30_c$.

The capacitor 918 is fully charged by a resistor 920, and is thus operatively disconnected from the capacitor 906 by the then reverse biased diode 919 following this initial period. The capacitor 918 does not participate in determining the frequency of the variable frequency oscillator 908 thereafter. Following any shut down of the motor, or any triggering of the SCR 701, the capacitor 918 rapidly discharges via a diode 927 and a resistor 922 to again desensitize the protective circuit 900 when the motor is again accelerated.

Figure 4:
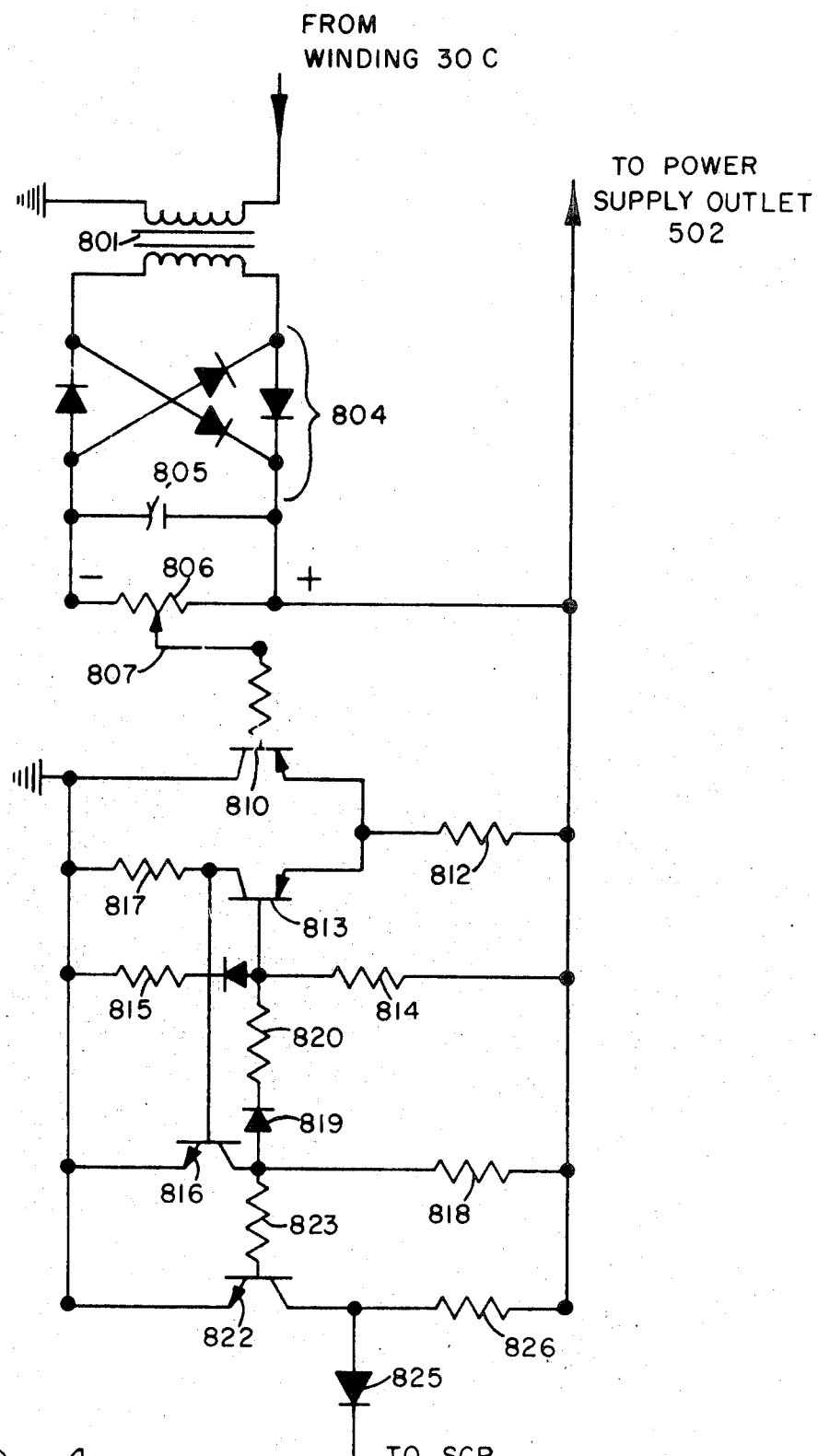
FIG. 4 is a schematic diagram depicting an undervoltage protective circuit 800 shown in block form in FIG. 1B.

Finally, in accordance with other aspects of the present invention, the undervoltage protective control circuitry 800 (FIGS. 1 and 4) disconnects the motor 20 from the three phase source 50 when the applied line voltage falls below a minimal acceptable level. The primary winding of a transformer 801 is connected to one of the applied line voltage phases, e.g., to the phase C, as between the conductor $30_c$ and ground (FIG. 1). A transformed replica of the phase C line voltage, typically much reduced in amplitude, is developed across a transformer secondary winding and converted to a direct voltage by a full wave bridge rectifier 804 and a shunt resistance-capacitor low pass filter network 806–805, the polarity of the D. C. voltage being as shown in FIG. 4.

The positive end of the potentiometer 806 is connected to the voltage supplied by the source 500, and the potential at the variable tap 807 of the potentiometer is thus less than that of the supply voltage. This voltage is supplied to the base of a PNP transistor 810 which is connected in a difference amplifier configuration with a PNP transistor 813, the emitters of the transistors 810 and 813 being connected by a common resistance 812 to the supply voltage.

The base of the transistor 813 is connected by an effective voltage divider network to a potential normally more positive than that present at the potentiometer tap 807. The voltage divider for the quiescent condition of the circuitry 800 comprises, as one effective branch, a resistor 804 in parallel with series combined resistors 820 and 818. The second voltage divider resistance branch comprises the element 815 which connects the voltage divider junction at the base of the transistor 813 to ground.

The tap 807 of the potentiometer 806 is adjusted such that the base of the transistor 810 will be less positive than that of the transistor 813 for the full acceptable voltage range. As long as the applied motor voltage remains above a minimum level, the transistor 810 is forward biased by the difference amplifier operation and conducts while the transistor 813 is reversed biased and does not. Thus, there is no positive potential developed across a collector-resistor 817 for the transistor 813, and a NPN transistor 816 is nonconductive. Further, the collector of the transistor 816 is passive and is not clamped to ground, thus allowing current to flow from the positive source 500 into the base of a transistor 822 by way of resistors 818 and 823 to saturate the transistor 822. With the transistor 822 saturated, the collector of the device 822 is near ground, and no voltage is passed by the diode 825 to fire the motor disabling silicon controlled rectifier 701.

When the phase C line voltage falls below the critical voltage level where the motor 20 might be damaged by further use, the output of the transformer 801 falls below its nominal level as does the direct voltage across the capacitor 805 and the potentiometer 806. The voltage at the potentiometer tap 807 thus rises to approach and exceed the voltage at the base of the transistor 813. The transistor 813 is no longer reverse biased, and begins to conduct. The resulting collector current produces a positive voltage across the resistor 817 and forward biases the transistor 816 which intiates conduction. As the collector voltage of the transistor 816 falls, the potential at the base of the transistor 813 decreases, thereby rendering the transistor 813 even more conductive. This regenerative operation continues until the transistor 813 is conducting while the companion difference amplifier transistor 810 is not, with the transistor 816 correspondingly being driven to saturation.

As the transistor 816 saturates, forward base drive is removed from the transistor 822 which becomes nonconductive. Accordingly, a positive voltage is supplied to the silicon controlled rectifier 701 through a resistor 826 and the diode 825. This fires the rectifier 701 to disable the output 502 of the power supply 500, thereby operatively removing power from the motor 20 until the difficulty is repaired, and the rectifier 701 de-energized by momentarily opening the switch 705.

Thus, the protective circuits 800 and 900 have been shown by the above to remove power from the motor 20 responsive to undervoltage or overload (overcurrent) conditions.

The above-described arrangement is merely illustrative of the principles of the present invention. Numerous modifications and adaptations thereof will be readily apparent to those skilled in the art without departing from the spirit and scope of the present invention. For example, the control arrangement shown in the drawing may be employed to control the starting and running of a single electrical phase drive motor, only one of the restoring circuits 100 and one of the transformer secondary windings 301 and rectifiers 105 being employed, together with their ancillary structure.

What is claimed is:

1. An overload protective circuit for use in a motor control circuit which provides an output signal when the input signal to the motor exceeds a predetermined amplitude, said overload protective circuit comprising:

sensing means for providing an output signal proportional to the amplitude of the input signal to the motor;
a variable frequency oscillator electrically connected to said sensing means and having a characteristic frequency which varies with the amplitude of the sensing means output singnal;
a constant frequency oscillator electrically connected to said variable frequency oscillator and normally having a characteristic frequency higher than the characteristic frequency of said variable frequency oscillator when the input signal to the load is below the predetermined amplitude;
said variable frequency oscillator including means for providing an output signal when the characteristic frequency of said variable frequency oscillator exceeds the characteristic frequency of said fixed frequency oscillator; and
means for normally preventing energization of said output signal means until the characteristic frequency of the variable frequency oscillator exceeds the characteristic frequency of said constant frequency oscillator.

2. An overload protective circuit as claimed in claim 1 wherein:
said variable frequency oscillator includes a timing capacitor;
said energization preventing means includes a transistor having its collector-emitter connected in parallel with said timing capacitor and its base connected to said constant frequency oscillator.

3. An overload protective circuit as claimed in claim 1 wherein:
said variable frequency oscillator includes a unijunction transistor.

4. An overload protective circuit as claimed in claim 1 wherein:
said constant frequency oscillator includes a unijunction transistor.

5. An overload protective circuit as claimed in claim 1 including:
means for increasing the period of said variable frequency oscillator when the input signal is initially applied to the motor to prevent undesired triggering of said output signal providing means.

6. An overload protective circuit as claimed in claim 5 wherein:
said variable frequency oscillator includes a timing capacitor;
said period increasing means includes a charging capacitor, a charging resistor, and a diode for connecting said charging capacitor in parallel with said timing capacitor during charging and for disconnecting said charging capacitor from said timing capacitor when said charging capacitor is fully charged.

7. An overload protective circuit as claimed in claim 6 including:
means for discharging said fully charged charging capacitor when an output is supplied by said output means.

8. An overload protective circuit as claimed in claim 1 wherein:
said sensing means includes a coil, a full wave rectifying bridge coupled to said coil, and a low pass filter coupled to said full wave rectifying bridge.

9. An overload protective circuit as claimed in claim 1 including:
a d.c. power source to drive said variable frequency oscillator.

* * * * *